July 26, 1949.   P. L. SPENCER ET AL   2,477,013
ELECTRIC PLUG
Filed Feb. 18, 1946
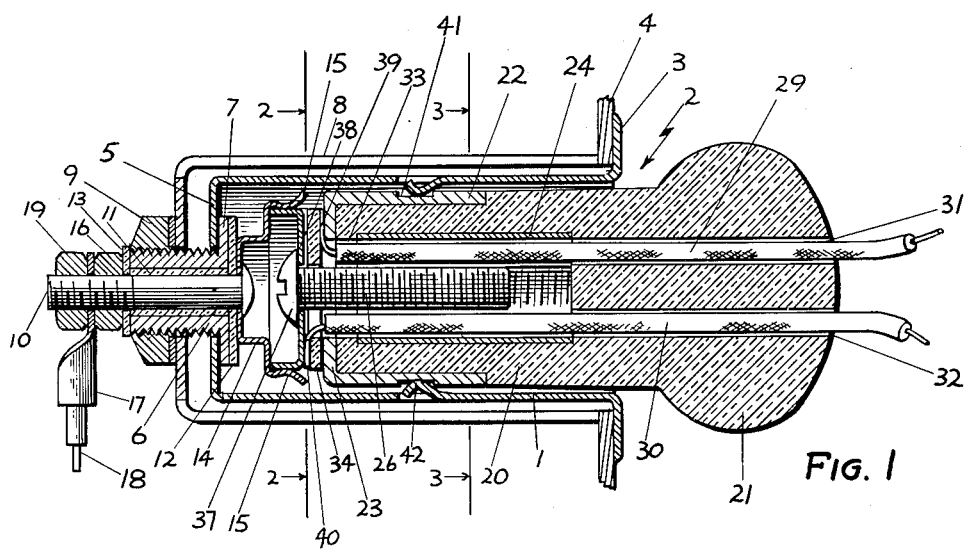
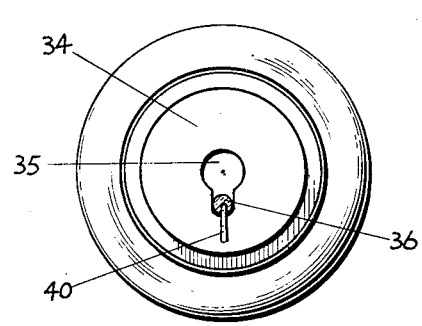
FIG. 2
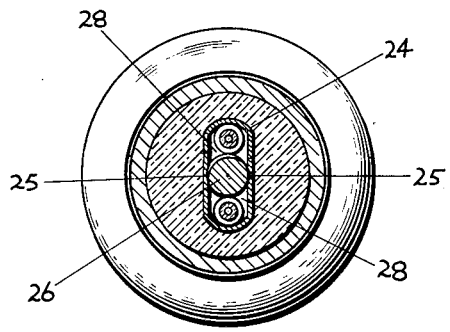
FIG. 3
INVENTORS
PERCY L. SPENCER
FRANCIS C. GRATCYK
BY Elmer J. Gorn
ATTY.

Patented July 26, 1949

2,477,013

UNITED STATES PATENT OFFICE 2,477,013

ELECTRIC PLUG

Percy L. Spencer, West Newton, and Francis C. Gratcyk, Wilmington, Mass., assignors to Raytheon Manufacturing Company, Newton, Mass., a corporation of Delaware Application February 18, 1946, Serial No. 648,391

1 Claim. (Cl. 173—361)

This invention relates to an electric plug and more particularly to the combination of such a plug with a cigar lighter socket on an automobile.

An object of this invention is to provide a readily detachable plug and cigar lighter socket arrangement whereby an auxiliary electrical device, such as a portable radio, an electric shaver, a portable lamp, an electric vulcanizer, or the like, readily may be connected in the battery circuit of an automobile.

A further object is to devise such a plug which is extremely simple in construction and capable of being electrically connected to its lead wires by a single fastening means.

The foregoing and other objects of this invention will be more readily understood from the following description of an exemplification thereof, reference being had to the accompanying drawing wherein:

Fig. 1 is a cross-section through an electric cigar lighter socket and a plug incorporating the invention;

Fig. 2 is a cross-section of the plug taken along line 2—2 of Fig. 1 with the fastening means omitted; and Fig. 3 is a cross-section of the plug taken along line 3—3 of Fig. 1.

The device illustrated in the drawing comprises a holder 1 and a plug 2. The holder 1 is provided at its outer end with an out-turned flange 3 adapted to engage a dashboard or other support 4 of an automobile when the holder is positioned in an aperture therein. It is to be understood that the member 4 is of metal and constitutes a grounded part of the automobile. The other end of the holder is closed with a transverse wall 5 having a threaded sleeve 6 passing therethrough.

The sleeve 6 is provided with a flange 7 which is secured by welding, or otherwise, to the end wall 5 to lock the sleeve in place. A stirrup or U-shaped bracket 8 is provided with an aperture in the transverse portion thereof to be positioned over the sleeve 6, and its forward end is caused to abut the back of the dashboard by a nut 9 threaded on the sleeve 6, thus locking the holder 1 in place.

A bolt 10 is mounted in the sleeve 6 and is insulated therefrom by an insulation sleeve 11 and a pair of washers 12 and 13. Between the washer 12 and the head of the bolt 10, a contact 14 is clamped. The contact is provided with outwardly projecting spring fingers 15 which extend within the holder. The bolt, insulation and contact are locked in position in the holder by a nut 16.

The contact is connected to a source of energy, such as the ungrounded terminal of the automobile battery, by means of a connector lug 17 mounted on the bolt and secured to a conductor 18 which is connected to the battery. The lug 17 is locked in place on the bolt by means of a nut 19.

The plug 2 consists of a substantially cylindrical insulating body 20 provided at its outer end with a knob 21 whereby the plug readily may be inserted into and removed from the holder. Molded into the outer surface of the body 20 is a metal ferrule 22 having an inturned annular end 23 overlying the inner end of the body 20. Also molded within the body 20 is a flattened nut-like hollow member 24 formed preferably of a material, such as metal, in which a thread may readily be cut. The member 24 is provided with an internal thread 25 along the central portion of its two side walls. A clamping bolt 26 is adapted to be threaded into the member 24 at the threaded section 25. Due to the flattened form of the member 24, spaces 28 are left on opposite sides of the bolt 26. A pair of insulated wires 29 and 30 pass through the spaces 28, entering said spaces through a pair of bores 31 and 32 formed in the insulating body 20. The inner end of the body 20 is likewise formed with an opening 33 of substantially the same size and shape as the member 24, whereby the conductors 29 and 30 may pass out through said opening. An insulating washer 34 overlies the annular end 23 of the metal ferrule 22. The washer is provided with a central circular opening 35 formed with a recess 36 in one side thereof. The head 37 of the bolt 26 is adapted to engage the outer surface of a contact member 38, which is formed in the shape of a cup having a hole in the center thereof, through which the bolt 26 passes. The cup 38 corresponds in size and shape with the analogous portion of the usual cigar lighter, in which portion the heating element of the cigar lighter is carried. The outer edges and sides of the cup 38 are adapted to make electrical contact with the fingers 15.

The end 39 of the conductor 29 is cleared of insulation and is bent over to lie against the outer surface of the annular member 23. The end 40 of the conductor 30 is likewise cleared of insulation. Before the bolt 26 is assembled with the structure, the end 40 may readily be passed through the enlarged circular opening 35 and then moved sideways into the recess 36. This greatly facilitates the assembly of the structure.

The end 40 is then turned over onto the outer face of the washer 34 and the cup 38 pressed down on top of it. Thereupon the entire assembly may be clamped together by means of the bolt 26. In this way the conductor 29 is electrically connected to the ferrule 22 and the conductor 30 is connected to the cup 38.

It will be noted that the above arrangement presents a plug structure which is extremely simple to assemble with its lead conductors and utilizes a single common fastening means in order to retain its conductors in firm electrical contact with its external contact members.

The ferrule 22 is provided with an annular recess 41 along its outside surface into which metal fingers 42 struck out from the holder 1 are adapted to pass. In this way the plug 2 is resiliently maintained in place within the holder 1 and electrical contact is made between the holder 1 and the metal ferrule 22.

Any desired auxiliary electrical equipment may readily be supplied from the conductors 29 and 30 as they extend exteriorly from the plug 2. It will be seen therefore that this arrangement provides a very convenient means for supplying such auxiliary equipment from the battery of the automobile. It is to be understood that the plug 2 corresponds in its external dimensions, including those of its external contacts, to the usual cigar lighter. When it is desired to connect a piece of auxiliary equipment to the battery, the cigar lighter may be extracted from its holder and the plug 2 replaced therein.

Of course it is to be understood that this invention is not limited to the particular details as described above inasmuch as many equivalents will suggest themselves to those skilled in the art.

What is claimed is:

An electrical plug comprising an insulating body carrying on its outer side wall a metal ferrule having an annular end overlying one end of said insulating body, a flattened hollow member secured within said body and threaded along its central portion, a circular bolt threadedly engaging said hollow member along its threaded portion, thus leaving spaces through said hollow member on opposite sides of said bolt, a pair of electrical conductors extending through said spaces, an insulating washer overlying said annular end, an electrically conductive end plate overlying said washer, an end of one of said conductors lying between said annular end and said washer and an end of the other of said conductors lying between said washer and said end plate, said bolt being provided with a head portion which engages said end plate to clamp said end plate, washer, and conductor ends in position.

PERCY L. SPENCER.
FRANCIS C. GRATCYK.

REFERENCES CITED

The following references are of record in the file of this patent:

UNITED STATES PATENTS

| Number | Name | Date |
| --- | --- | --- |
| 1,830,597 | Ennis | Nov. 3, 1931 |
| 2,236,435 | Lockshin | Mar. 25, 1941 |